United States Patent [19]

Orlitzky et al.

[11] 4,023,648

[45] May 17, 1977

[54] LUBRICANT APPLICATORS

[76] Inventors: Anton Orlitzky, 5291 -6th Ave., Delta, British Columbia; Colin W. Oloman, 4573 W. 2nd Ave.; Helmut E. Fandrich, 6411 Cambie St., both of Vancouver, British Columbia, all of Canada

[22] Filed: May 9, 1974

[21] Appl. No.: 468,221

[52] U.S. Cl. .................. 184/39; 204/DIG. 6; 222/389; 338/77
[51] Int. Cl.² ........................................ F16N 11/10
[58] Field of Search ............ 184/39, 29, 49, 50 A, 184/54, 55 R, 98, 6.26, 7 CR, 14, 27 B; 239/323; 222/389, 386.5, 3; 35/19 A; 204/DIG. 6, DIG. 3, 150, 195 S

[56] References Cited

UNITED STATES PATENTS

| 338,770 | 3/1886 | Otto | 136/100 R |
|---|---|---|---|
| 1,696,774 | 12/1928 | Martin | 184/39 X |
| 1,916,235 | 7/1933 | Ruben | 204/DIG. 6 X |
| 2,680,449 | 6/1954 | Toulmin, Jr. | 184/14 X |
| 3,425,697 | 2/1969 | Svagerko | 273/130 AB |
| 3,430,731 | 3/1969 | Satzinger | 184/39 |
| 3,842,939 | 10/1974 | Satzinger | 184/39 |
| 3,877,989 | 4/1975 | Waldman et al. | 204/DIG. 6 X |

FOREIGN PATENTS OR APPLICATIONS

| 1,515,849 | 1/1970 | Germany | 204/DIG. 6 |
|---|---|---|---|
| 4,862 | 1913 | United Kingdom | 338/77 |
| 185,439 | 8/1966 | U.S.S.R. | 35/19 A |

*Primary Examiner*—Richard C. Pinkham
*Assistant Examiner*—Arnold W. Kramer
*Attorney, Agent, or Firm*—Larson, Taylor and Hinds

[57] ABSTRACT

A lubricant applicator including a container having an outlet to be connected to the lubricating system of a bearing, a separator in the container movable to force lubricant out through said outlet, a gas chamber behind the separator and in communication with the container, a cathode and an anode in the chamber and forming part of an electrical circuit, a switch for breaking and making the circuit, and an electrolyte in contact with the anode and cathode for generating gas when electrical current flows through the circuit, the generated gas applying pressure to the separator to force lubricant out through the outlet.

25 Claims, 7 Drawing Figures

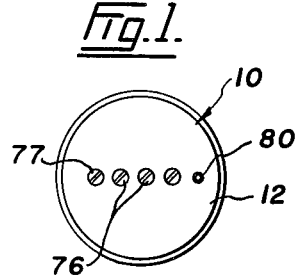
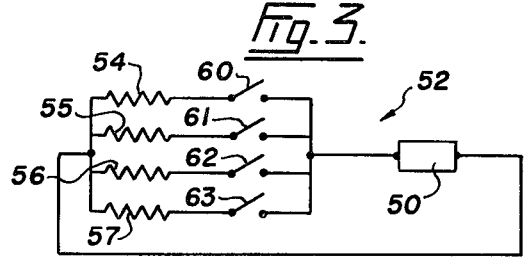
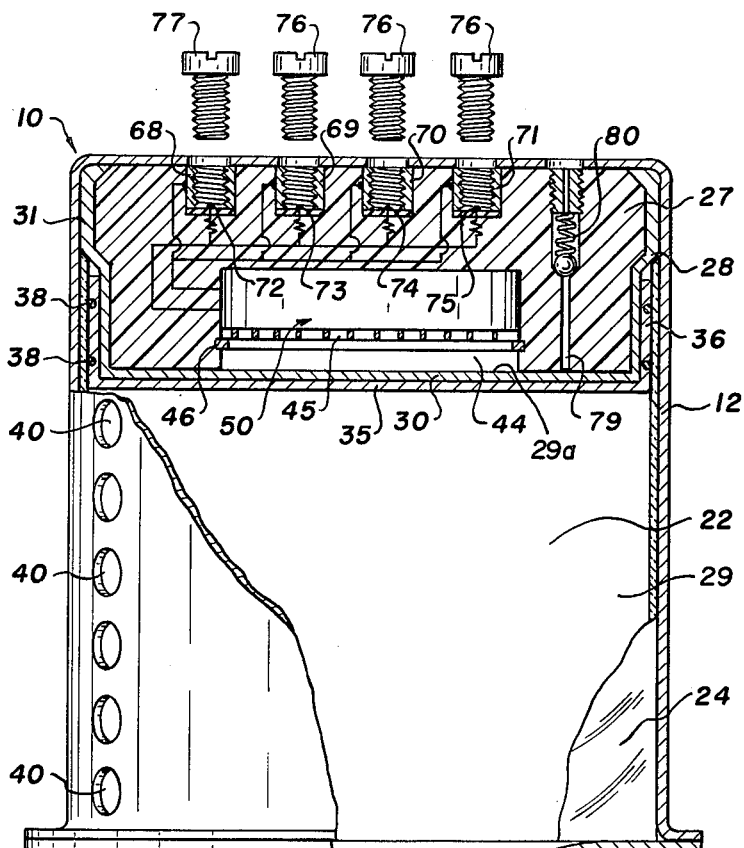

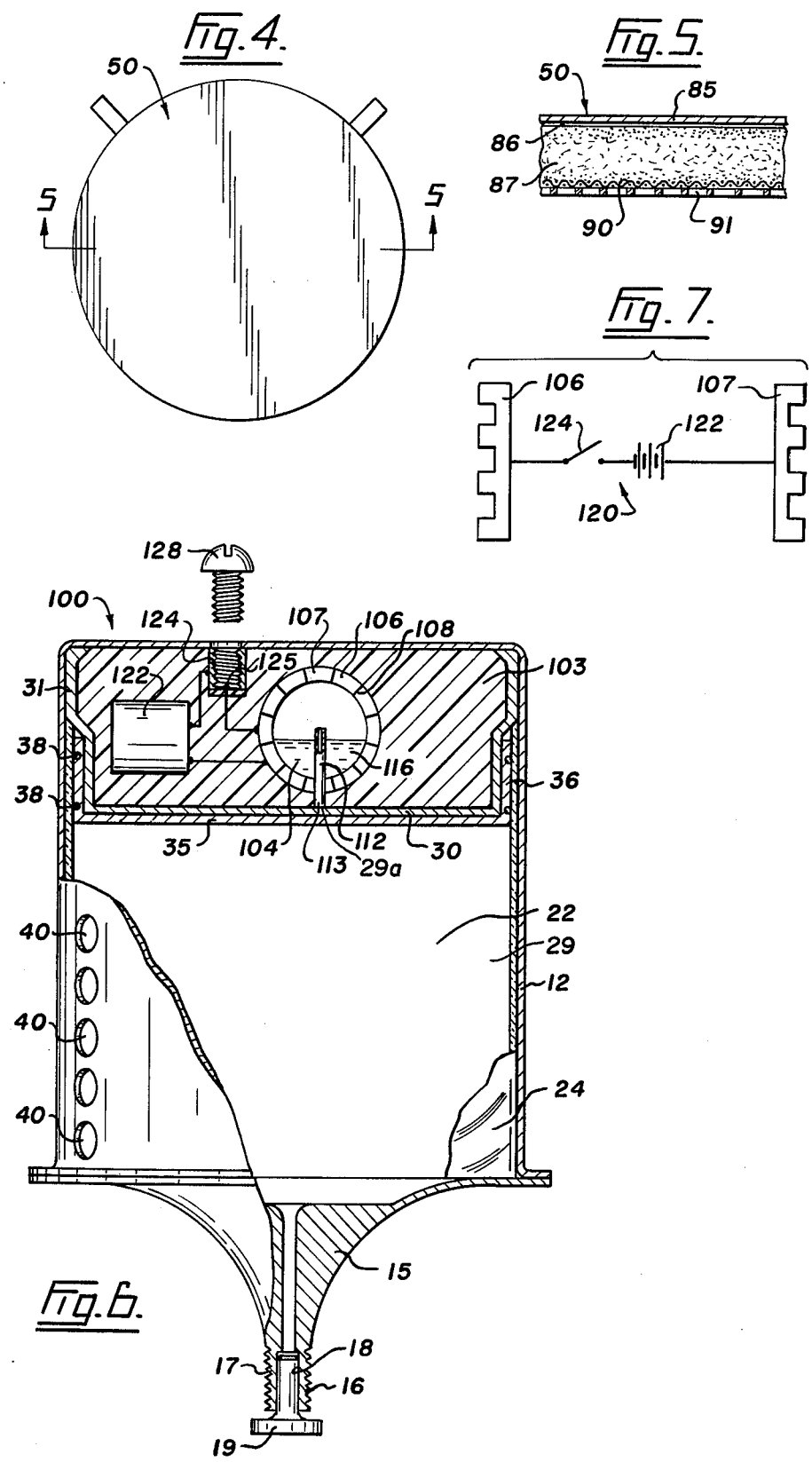

LUBRICANT APPLICATORS

This invention relates to apparatus to constantly supplying lubricants to any bearings of the type having lubricating systems associated therewith. This apparatus can be used to supply other materials, such as chemicals, and so the term "lubricant" is intended to include any viscous material or any liquid.

In the past, most bearings in engines and other machinery were periodically lubricated by means of a grease gun, or by a grease box attached to a lubricant fitting. As a result, the lubricating of the bearings was dependent upon someone attending to them periodically.

The main purpose of the present invention is the provision of apparatus for continuously and automatically lubricating these bearings so that this operation does not depend upon anyone's memory. It is also well known that many bearings were hardly ever lubricated since it was difficult to get at them. Once installed, the present lubricator maintains the lubricating operation as long as it contains lubricant. In addition, this lubricator can be set to discharge the lubricants at different rates.

Lubricators are known in the prior art which utilize compressed air or a gas generating cartridge for lubricating purposes, but these have not been satisfactory. If the air pressure is too high, there is danger of over-lubricating the bearings, and if the pressure is too low, the bearings are starved for lubricant. An example of another prior art lubricator is shown in Canadian Pat. No. 813,195, dated May 20, 1969. However, in the patented lubricator, a screw is turned to eject negative and positive electrodes of a galvanic element into an electrolyte. As a result, once the lubricator is started, there is no way of stopping it and no way of controlling the pressure generated to eject the lubricant to the bearing. In addition, the rate of lubrication is adversely affected by changes in the ambient temperature.

The lubricating of the present invention is such that it can be stopped and started at any time. In one form of the invention, the pressure generated for the ejection of the lubricant can be adjusted to suit the bearing being lubricated or the ambient weather conditions. This lubricator is constructed so that it is almost impossible for any of the generated gas to escape.

The lubricating apparatus in accordance with this invention includes an electrical circuit for generating the gas, and this circuit includes a switch for making and breaking the circuit. In addition, the circuit may have a plurality of resistors in it arranged in parallel, these resistors being of different values so that the flow of current through the circuit can be controlled or preset.

Another feature of the present invention is a cell for generating electrical current when the circuit in which the cell is connected is closed. This cell also includes electrolyte which, when current flows through it, generates a gas, the pressure of which is utilized to expel the lubricant from the device.

Lubricating apparatus in accordance with this invention comprises a container having an outlet in an end thereof and adapted to be connected to the lubricating outlet of a bearing, a separator near an end of the container remote from said outlet movable to force lubricant in the container out through said outlet, a gas chamber in the container behind the separator and in communication with the container, a cathode and an anode in said chamber and forming part of an electrical circuit, switch means in the circuit to break and make said circuit, and electrolyte means contacting the anode and cathode for generating gas when electrical current flows through said circuit, said generated gas applying pressure to the separator to force lubricant out through said outlet.

Two examples of the present invention are illustrated in the accompanying drawings, in which FIG. 1 is a plan view of a preferred form of the applicator, FIG. 2 is an enlarged vertical section through this applicator with the electrical wiring diagrammatically illustrated, FIG. 3 is a diagram of the electrical system of this applicator, FIG. 4 is an enlarged plan view of the power cell for the applicator, FIG. 5 is a cross-section taken on the line 5—5 of FIG. 4, FIG. 6 is the vertical section through an alternative form of the applicator and FIG. 7 is a diagram of the electrical system of the applicator of FIG. 6.

Referring to FIGS. 1 to 5, 10 is a preferred form of lubricant applicator in accordance with this invention. This applicator includes a strong container 12 which may be made from any suitable material, but preferably is made of steel. This container has a funnel-shaped bottom 15 which is externally threaded at 16 and is of such size and shape as to be threaded into the lubricating opening of a bearing from which the standard lubricating cup has been removed. The lower end 17 of the container bottom has a relatively small passage 18 extending therethrough which is closed by a temporary plug 19 when the applicator is not in use. A suitable lubricant or grease 22 is provided in container 12. It is preferable to provide a transparent sleeve 24 for container 12 in which the grease is contained, said sleeve preferably being formed of clear plastic material.

A head 27 is mounted within container 12 at the end thereof remote from bottom 15. This head is shaped to accommodate sleeve 24, as shown at 28 in FIG. 2. A separator is movably mounted in the container for movement towards outlet passage 18 and divides the container into a lubricant chamber 29 and a gas chamber 29a. This separator includes means for preventing gas from moving from gas chamber 29a, to lubricant chamber 29. In this example, the separator includes a gas-proof diaphragm 30 extending across the bottom of head 27, and having a skirt 31 which fits over the side of the head and is fixedly secured between the latter and sleeve 24, which is pressed against said skirt firmly to hold the diaphragm in position. The separator preferably also includes a piston 35 in the container, said piston having an annular wall 36 projecting upwardly therefrom and slidably fitting inside sleeve 24. Sealing means, such as O-rings 38, is provided around wall 36 between it and sleeve 24. These rings slide against the inner surface of the sleeve to keep piston 35 from tipping within the sleeve. It will be noted from FIG. 2, that when the container is full of grease, piston wall 36 fits up into the space 28 between sleeve 24 and skirt 31 of diaphragm 30. Container 12 is provided with a plurality of vertically arranged sight ports 40 so that it is possible to see the amount of grease within sleeve 24.

Gas chamber 29a includes a reduced chamber 44 formed in head 27 and opening downwardly towards diaphragm 30. A perforated bottom 45 is provided for chamber 44, and is held in place by a snap ring 46. Electrical current and gas generating means in the form of a cell 50 is located in chamber 44 and rests on bottom 45. This cell is part of the electrical system 52 of the applicator, see FIG. 3. The circuit 52 has a plurality of resistors connected in parallel across the circuit, each resistor being in series with a switch. In this example, there are four resistors 54, 55, 56 and 57 respectively in series with switches 60, 61, 62, and 63. Each resistor is connected in the circuit when its switch is closed. These resistors have different resistance values. In this example, the resistance increases from resistor 54 to resistor 57.

Switches 60 to 63 are in the form of internally threaded sockets 68, 69, 70 and 71, respectively. In this example, the socket of each switch forms one contact, and additional contacts 72, 73, 74 and 75 are provided at the bottoms of and insulated from the respective sockets. The sockets are adapted to receive threaded plugs or screws, and when the applicator is not in use, a plug or screw 76 formed of non-conducting material is threaded into each socket. Although these screws are not absolutely necessary, they keep dirt of the sockets and prevent the circuits from being accidentally closed. At least one screw or plug 77 formed of conducting material is provided for use when the applicator is to be put into operation. When this screw is in one of the sockets, it engages the two contacts of said socket to close the switch formed thereby.

It is desirable to provide a passage 79 from the inner end to the outer end of head 27, this passage having a pressure relief valve 80 therein. It will be noted that each of the sockets 68 to 71 and the outer end of passage 79 are aligned with openings in the end of container 12. Passage 79 communicates at its inner end with gas chamber 29a between head 27 and diaphragm 30.

Cell 50 is illustrated in detail in FIGS. 4 and 5. This cell is in the form of a sandwich, and includes an anode 85 formed of zinc metal or some other metal or alloy which is electro-chemically suitable for this purpose. An example of another metal that could be used is magnesium. An absorbant insulating layer 86 formed of paper or cotton is provided inside the anode. This layer is impregnated with an electrolyte which is located in a realitvely thick layer 87 of paste made of carbon black or other similar material mixed with the electrolyte. The electrolyte consists, for example, of a mixture of a strong solution of lithium chloride in water (about 40% lithium chloride) with enough zinc chloride to bring the pH below about 6. This is usually around 10% zinc chloride. If desired, other suitable compounds, such as sodium chloride and calcium chloride, can be used in the electrolyte. The respective amounts of carbon and the electrolyte can be something of the order of 15 to 25% carbon and 80 – 75% by weight electrolyte. Beneath paste layer 87 there is a cathode 90 in the form of a fine mesh metal screen such as, for example, 100 mesh stainless steel, lead or similar material. A sheet 91 forms the bottom of the cell, this sheet being in the form of a plastic screen to allow the escape of gas, for example, 12 mesh polypropylene.

When it is desired to use applicator 10, plug 19 is withdrawn, and end 17 of the container bottom 15 is screwed into the grease opening of the bearing to be lubricated. The flow of electrical current in circuit 52 determines the amount of gas being generated in a given time. The generated gas flows into chamber 29a and against the diaphragm 30 and piston 35 to move the latter against the lubricant in chamber 29, thereby forcing lubricant out through outlet passage 18. As resistor 54 has the lowest resistance value, if plug 77 is threaded into socket 68, the gas is generated rather rpadily, and the lubricant is forced out of the container in the same way. The electrical current flow through cell 50 causes gas to be generated, and this fills chamber 44 and presses diaphragm 30 downwardly against piston 35. This pressure expels the lubricant through passage 18. If the generation of gas needs to be slowed down, plug 77 can be fitted into one of the other sockets.

This lubricator compensates to a degree for changes in temperature. For example, if the temperature goes down, the generated voltage decreases and the internal resistance in cell 50 increases, but the resistors are made of metal, the resistance of which decreases as the temperature drops in to compensate for the changed conditions. As the temperature rises, the opposite takes place.

The chemical reactions which occur to produce hydrogen gas when the cell circuit is closed are briefly:

At the zinc anode

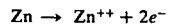

At the cathode

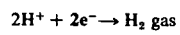

These reactions are self sustaining and occur when the switch in the external circuit is closed.

In actual practice, the resistance of each of the resistors is many times greater than the internal resistance of the cell. For example, in a device set so as to expell 200 ccs of lubricant in 30 days, the necessary current which flows through the circuit is about 1.5 milliamperes. Under these conditions at room temperature the resistance in the cell is about 5 ohms whereas the external resistance of the resistor is about 100 ohms. As a result, changes in the ambient temperature has relatively little effect on the current flow, and hence on the rate of gas generation.

In the illustrated example, when resistor 54 is used, the lubricant is discharged in about 30 days, whereas with resistors 55, 56 and 57, the discharge time is about 60, 90 and 120 days, respectively.

FIGS. 6 an 7 illustrate an alternative form of lubricated applicator 100. As some parts of this lubricator are the same as corresponding parts in applicator 10, they are identified by the same numerals.

A head 103 is mounted in container 12, and a spherical chamber or cell 104 is located in the head. The wall of the chamber is made up of an anode 106 and a cathode 107 arranged in interleaved segments separated from each other by insulators 108. A tube 112 extends into the chamber 104 and has an inner end 113 opening out at the centre of the chamber. A suitable electrolyte 116 is placed in chamber 104, but fills less than half the chamber so that it will not run out through tube 112 regardless of which way the applicator is lying. Tube 12 opens out from the head into the space 29a between the latter and diaphragm 30.

Anode 106 and cathode 107 are arranged at opposite ends of an electrical circuit 120, which also includes a battery 122 having a desired voltage and capacity, such as, for example, 2 volts and 1 amphere hour, also mounted in head 103. The actual current flowing is of the order of 1.5 milliamperes in a 30 day unit. The circuit also includes a switch which in this alternative is an internally threaded socket 124. The socket forms one contact which is separated and insulated from another contact 125 at the bottom of the socket. A conducting screw or plug 128 is threadable in the socket to close the switch. If desired, a threaded plug or screw (not shown) formed of non-conducting material may be provided for insertion into socket 124 when the applicator is not in use. The battery 122 along the cell 104 and its associated element form electrical current and gas generating means for applicator 100.

When applicator 100 is in use, plug 128 is inserted in socket 124 to close circuit 120. Current flows through the circuit when at least one segment of anode 106 and at least one segment of cathode 107 are in contact with electrolyte 116. The current flow through the electrolyte generates gas, and this escapes through tube 112 to apply pressure to diaphragm 30 to move piston 35 against the grease to expel the latter through passage 18.

We claim:

1. Apparatus for constantly supplying lubricant to a bearing, comprising a container having an outlet in an end thereof and adapted to be connected to a lubricating system, a separator movably mounted in the container spaced from and movable towards said outlet and dividing said container into a lubricant chamber on the outlet side thereof and a gas chamber on its opposite side, said separator including means for preventing gas from moving from the gas chamber into the lubricant chamber, electrical current and gas generating means in the container and in communication with the gas chamber, said current and gas generating means including a cell having therein a cathode separated from an anode, an electrolyte confined within the cell and at all times in contact with the cathode and the anode, means in the cell preventing the flow of electrolyte from the cell while permitting gas to flow therefrom to the gas chamber, an electrical circuit, in the container external of the cell, for connecting said cathode to said anode, switch means, located in the circuit between said cathode and said anode, for, when activated, closing said circuit to cause electrical current flow through said electrolyte and the consequent generation of gas which flows into the gas chamber and against the separator to move said separator against lubricant in the lubricant chamber to force said lubricant out through the outlet.

2. Apparatus as claimed in claim 1 in which said switch means comprises a socket having spaced contacts and opening out from the container, said circuit being connected to said contacts, and a conducting plug insertable in said socket to engage said contacts and thereby make said circuit.

3. Apparatus as claimed in claim 1 in which said separator comprises a piston slidably mounted in the container between the gas chamber and the lubricant chamber.

4. Apparatus as claimed in claim 3 in which said means for preventing gas from moving from the gas chamber into the lubricant chamber comprises an expansible diaphragm against the piston on the gas chamber side thereof and connected to the container wall.

5. Apparatus as claimed in claim 3 including an open-ended sleeve fitting in the container around the lubricant chamber, said piston being slidable within said sleeve.

6. Apparatus as claimed in claim 5 in which said sleeve is transparent, and incuding axially-spaced openings in the container and through which the lubricant in the sleeve and container can be seen.

7. Apparatus as claimed in claim 1 including a plurality of resistors each of a different resistance value mounted in parallel across said circuit, and said switch means comprising a plurality of switches with a respective switch in series with each resistor, whereby the switch and its respective resistance value selected to make the circuit, by affecting the generation of gas, determine the rate of discharge of lubricant through said outlet.

8. Apparatus as claimed in claim 7 in which each switch comprises a socket opening out from the container and having spaced contacts, said contacts of each socket each being connected in series with a respective one of the resistors, and at least one conducting plug adapted to be inserted in any one of said sockets to engage the contacts thereof and to close the circuit of the latter contacts.

9. Apparatus as claimed in claim 8 including a plurality of non-conducting plugs adapted to be inserted in said sockets to keep the circuits thereof open.

10. Apparatus as claimed in claim 1 including a relief valve in the container for blowing off if the pressure of the gas reaches a predetermined level.

11. Apparatus as claimed in claim 1 in which said switch means comprises a socekt having spaced contacts and opening out from the container, said circuit being connected to said contacts, and a conducting plug insertable in said socket to engage said contacts and thereby make said circuit.

12. Apparatus as claimed in claim 1 including a plurality of resistors each of a different resistance value mounted in parallel across said circuit, and said switch means comprising a plurality of switches with a respective switch in series with each resistor, whereby the swich and its respective resistance value selected to make the circuit, by affecting the generation of gas, determine the rate of discharge of lubricant through said outlet.

13. Apparatus as claimed in claim 12 in which each switch comprises a socket opening out from the container and having spaced contacts, said contacts of each socket each being connected in series with a respective one of the resistors, and at least one conducting plug adapted to be inserted in any one of said sockets to engage the contacts thereof and to close the circuit of the latter contacts.

14. Apparatus for constantly supplying lubricant to a bearing, comprising a container having an outlet in an end thereof and adapted to be connected to the lubricating system of a bearing, a separator movably mounted in the container spaced from and movable towards said outlet and dividing said container into a lubricant chamber on the outlet side thereof and a gas chamber on its opposite side, said separator including means for preventing gas from moving from the gas chamber into the lubricant chamber, electrical current and gas generating means in the container and in communication with the gas chamber, said current and gas generating means including a cell having therein a cathode spaced from an anode, an electrolyte confined within the cell and at all times in contact with the cathode and the anode, means in the cell preventing the flow of electrolyte from the cell while permitting gas to flow therefrom to be gas chamber, an electrical circuit in the container external of the cell and extending from said cathode to said anode, and switch means in the circuit for, when activated, completing said circuit so that an electrical current flows through said electrolyte between said cathode and said anode to cause generation of gas by said electrolyte which exerts pressure on said separator to force lubricant in said lubricant chamber out through said outlet.

15. Apparatus as claimed in claim 1 in which said switch means comprises a socket having spaced contacts and opening out from the container, said circuit being connected to said contacts, and a conducting plug insertable in said socket to engage said contacts and thereby make said circuit.

16. Apparatus as claimed in claim 14 including a plurality of external resistors each of a different resistance value mounted in parallel across said circuit, and said switch means comprising a plurality of switches with a respective switch in series with each resistor, whereby the switch and its respective resistance value selected to make the circuit, by affecting the generation of gas, determines the rate of discharge of lubricant through said outlet.

17. Apparatus as claimed in claim 16 in which the resistance of each external resistor is several time greater than the internal resistance of said cell so that decreases and increases in the external termperature have relatively little affect on the overall current flow and hence the rate of gas generation is substantially constant.

18. Apparatus as claimed in claim 16 in which each switch comprises a socket opening out from the container and having spaced contacts, said contacts being connected in series with one of the resistors, and at least one conducting plug adapted to be inserted in any one of said sockets to engage the contacts thereof and to close the circuit of the latter contacts.

19. Apparatus for constantly supplying lubricant to a bearing, comprising a container having an outlet in an end thereof and adapted to be connected to the lubricating system of a bearing, a diaphragm near an end of the container remote from said outlet expandible to force lubricant in the container out through said outlet, a gas chamber in the container behind the diaphragm and in communication with the diaphragm, a cathode spaced from an anode in said chamber, and electrical circuit outside the chamber for connecting the cathode to the anode, a battery connected in said electrical circuit, an electrolyte in continuous contact at all times with the cathode and the anode and switch means for, when activated, completing said electrical circuit so as to cause electrical current flow through said electrolyte and the consequent generation of a gas by said electrolyte which exerts pressure on the diaphragm to force lubricant out through said outelt.

20. Apparatus for constantly supplying lubricant to a bearing, comprising a container having an outlet in an end thereof and adapted to be connected to the lubricating system of a bearing, a diaphragm, disposed near an end of the container remote from said outlet, which is expandible to force lubricant in the container out through said outlet, a spherical gas chamber in the container behind the diaphragm, said chamber comprising a cathode and an anode arranged around a central axis and formed by interleaved segments separated from each other by insulating means therebetween, an electrical circuit connected at one end to the cathode segments and at an opposite end to the anode segments a battery connected in said circuit, an electrolyte in the chamber in continuous contact at all times with said anode and said cathode, switch means for, when activated, completing said electrical circuit through said electrolyte so that a gas is generated by said electrolyte and a gas passage extending from above the electrolyte in the chamber out of said chamber for directing generated gas against the diaphragm to force lubricant out through said outlet.

21. Apparatus as claimed in claim 20 in which said switch means comprises a socket having spaced contacts and opening out from the container, said circuit being connected to said contacts, and a conducting plug insertable in said socket to engage said contacts and thereby make said circuit.

22. Apparatus as claimed in claim 20 including a piston slidable in the container between the diaphragm and the lubricant.

23. Apparatus as claimed in claim 20 including an open-ended sleeve fitting in the container around the lubricant, and a piston slidable within said sleeve and located between the diaphragm and the lubricant.

24. Apparatus as claimed in claim 23 in which said sleeve is transparent, and including axially-spaced openings in the container and through which the lubricant in the sleeve and container can be seen.

25. Apparatus for constantly supplying lubricant to a bearing, comprising a container having an outlet in an end thereof and adapted to be connected to a lubricating system, a separator movably mounted in the container spaced from and movable towards said outlet and dividing said container into a lubricant chamber on the outlet side thereof and a gas chamber on its opposite side, said separator including means for preventing gas from moving from the gas chamber into the lubricant chamber, an electrical current and gas generating means in the container behind the separator and in communication with said gas chamber and including a gas-generating cell having a cathode separated from an anode with an electrolyte confined within the cell and in contact at all times with both the cathode and the anode, means in the cell for preventing the flow of electrolyte from the cell while permitting gas to flow therefrom to the gas chamber, an electrical circuit, in the container external of the cell, for connecting the cathode to the anode, switch means, in the circuit between the cathode and the anode, for, when activated, completing said circuit such that electrical current flows through said switch means and the circuit and a gas is thus generated which flows into the gas chamber and against the separator to move said separator against lubricant in the lubricant chamber to force said lubricant out through said outlet.

* * * * *